(12) United States Patent
Skogward

(10) Patent No.: US 6,415,677 B1
(45) Date of Patent: Jul. 9, 2002

(54) MANEUVERING DEVICE

(75) Inventor: Kenneth Skogward, Huskvarna (SE)

(73) Assignee: Kongsberg Automotive AB (SE)

( * ) Notice: Subject to any disclaimer, the term of this patent is extended or adjusted under 35 U.S.C. 154(b) by 0 days.

(21) Appl. No.: 09/485,363

(22) PCT Filed: Aug. 19, 1998

(86) PCT No.: PCT/SE98/01498
§ 371 (c)(1),
(2), (4) Date: Feb. 8, 2000

(87) PCT Pub. No.: WO99/11951
PCT Pub. Date: Mar. 11, 1999

(30) Foreign Application Priority Data

Aug. 19, 1997 (SE) .............................................. 9702977

(51) Int. Cl.⁷ ............................. F16H 59/02; G01R 33/00
(52) U.S. Cl. .................. 74/473.12; 74/335; 324/117 H; 324/207.2
(58) Field of Search ............................. 74/335, 473.12; 324/207.2, 117 H

(56) References Cited

U.S. PATENT DOCUMENTS

| 4,022,078 A | * | 5/1977 | Malott ........................ 74/473.3 |
| 4,519,266 A | | 5/1985 | Reinecke |
| 4,610,179 A | * | 9/1986 | Parker .......................... 74/335 |
| 4,660,430 A | | 4/1987 | Bortfeld et al. |
| 4,757,257 A | * | 7/1988 | Washisu ................. 324/207.24 |
| 4,785,615 A | * | 11/1988 | Leigh-Monstevens ........ 60/534 |
| 4,987,792 A | | 1/1991 | Mueller et al. |
| 5,243,871 A | | 9/1993 | Weiten |
| 5,307,013 A | * | 4/1994 | Santos et al. ............. 324/207.2 |
| 5,370,015 A | * | 12/1994 | Moscatelli .................... 74/335 |
| 5,406,860 A | | 4/1995 | Easton et al. |

FOREIGN PATENT DOCUMENTS

| DE | 37 432 259 A1 | 6/1989 |
| EP | 0 620 385 A1 | 10/1994 |

* cited by examiner

*Primary Examiner*—Allan D. Herrmann
(74) *Attorney, Agent, or Firm*—Lerner, David, Littenberg, Krumholz & Mentlik, LLP

(57) ABSTRACT

Maneuvering apparatus is disclosed including a console, a maneuvering lever disposed relative to the console and movable between a plurality of predetermined positions, a planar detector mounted with respect to the console, a code bar mounted parallel to the planar detector for interacting with the planar detector based upon the relative positions of the code bar and the planar detector, the planar detector adapted to detect the relative position of the code bar, and a connector for connecting the maneuvering lever to the code bar whereby movement of the maneuvering lever between the plurality of positions causes the code bar to move substantially only in a single plane parallel to the detector.

7 Claims, 11 Drawing Sheets

| D | C | B | A | |
|---|---|---|---|---|
| 0 | 0 | 0 | 0 | + |
| 0 | 0 | 0 | 1 | |
| 0 | 0 | 1 | 1 | |
| 0 | 0 | 1 | 0 | R |
| 0 | 1 | 1 | 0 | |
| 0 | 1 | 1 | 1 | N |
| 0 | 1 | 0 | 1 | |
| 0 | 1 | 0 | 0 | D |
| 1 | 1 | 0 | 0 | |
| 1 | 1 | 0 | 1 | |
| 1 | 1 | 1 | 1 | |
| 1 | 1 | 1 | 0 | |
| 1 | 0 | 1 | 0 | - |
| 1 | 0 | 1 | 1 | |
| 1 | 0 | 0 | 1 | M |
| 1 | 0 | 0 | 0 | |

FIG. 8

MANEUVERING DEVICE

FIELD OF THE INVENTION

The present invention relates to a maneuvering apparatus which comprises a maneuvering lever and a sensor arrangement for detecting the movements of the maneuvering lever.

BACKGROUND OF THE INVENTION

In conventional maneuvering devices, such as gear levers in motor vehicles, the gear lever is generally mechanically connected to the system which the gear lever is to control; namely, the gearbox. However, some newer systems have constructions without a mechanical connection between the gear lever and the gearbox, in which case use is made of sensor arrangements for sensing the position and movements of the gear lever in order to be able to act on the gearbox in the desired manner.

In such systems which use sensor arrangements for sensing the position of the gear lever, it is of great importance that the sensor arrangements included in the system be as few in number, and as compact and inexpensive as possible. In most cases, previously known systems with sensor arrangements make use of a separate sensor arrangement for each direction in which the gear lever can move, or a sensor arrangement for each position in which the gear lever may be located.

U.S. Pat. No. 4,987,792 discloses an example of the latter type, with one sensor arrangement for each position which the gear lever can assume. It may be considered to be a disadvantage of such a system that it is relatively expensive and also that it takes up a relatively large area. It may also be considered to be a further disadvantage of such a system that further sensor arrangements must be provided if it is desired to have information on the position of the gear lever while gear-shifting movement is taking place.

European Patent No. 620,385 A1 discloses a maneuvering apparatus with a detector arrangement in the bottom of the maneuvering apparatus. A disadvantage of this apparatus is that its extent in the direction of the maneuvering lever is increased because of the positioning of the detector arrangement, which thus defeats the desire for the arrangement to be as compact and space-saving as possible.

U.S. Pat. No. 5,243,871 discloses an arrangement in which a code arrangement and a detector plate are arranged at the side of the maneuvering lever and in the wall of the maneuvering console, respectively, which thus provides a compact solution compared with the arrangement in European Patent No. 620,385. However, a disadvantage of the arrangement according to U.S. Pat. No. 5,243,871 is that, during movements in the upshift direction of the gear lever, the code arrangement will move away at right angles from the detector arrangement, which poses increased requirements for the sensitivity on the detector arrangement. Furthermore, the result of the increased distance between the code arrangement and the detector arrangement is that the arrangement as a whole is relatively susceptible to disturbances.

The aim of the present invention is therefore to produce a maneuvering apparatus with a compact and inexpensive sensor arrangement for detecting different positions of the maneuvering lever, which maneuvering apparatus can be used, for example, in gearboxes in motor vehicles.

The maneuvering lever is also to have reduced requirements for sensitivity compared with previously known arrangements, and also to be less susceptible to disturbances than previously known arrangements.

SUMMARY OF THE INVENTION

In accordance with the present invention, these and other objects have now been realized by the invention of a maneuvering apparatus comprising a console, a maneuvering lever disposed relative to the console and movable between a plurality of predetermined positions, a planar detector mounted with respect to the console, a coding member mounted parallel to the planar detector for interacting with the planar detector based upon the relative positions of the coding member and the planar detector, the planar detector adapted to detect the relative position of the coding member, and connection means for connecting the maneuvering lever to the coding member whereby movement of the maneuvering lever between the plurality of predetermined positions causes the coding member to move substantially only in a single plane parallel to the detector. In a preferred embodiment, the coding member includes an aperture and the console includes a groove, the connecting means comprising at least one frame associated with the maneuvering lever, and at least one bias pin mounted with respect to the at least one frame, the at least one bias pin being biased into a position projecting from the at least one frame whereby the at least one bias pin thereby projects through the aperture of the coding member and is movable in the groove in the console. In accordance with a preferred embodiment, the connecting means includes at least one plate spring associated with the frame and engaged with the coding member.

In accordance with one embodiment of the maneuvering apparatus of the present invention, the detector comprises a plurality of Hall elements, and the coding member comprises a plate including a plurality of magnetized regions for interacting with the plurality of Hall elements.

In accordance with another embodiment of the maneuvering apparatus of the present invention, the maneuvering lever comprises a gear lever in a motor vehicle.

The objects of the present invention are achieved by means of a maneuvering apparatus that is provided with means of converting all the movements of a maneuvering lever into movements of a code arrangement over a surface. The maneuvering apparatus according to the present invention comprises a maneuvering console, and the maneuvering lever is movable between a number of predetermined positions, and a code arrangement and a detector arrangement with which the code arrangement is adapted to interact.

The detector arrangement, which is preferably planar and arranged in a wall in the maneuvering console, comprises means for detecting the positions of the code arrangement over this area. The code arrangement is preferably also planar, and is arranged parallel to the detector arrangement, and performs all its movements essentially in one plane.

BRIEF DESCRIPTION OF THE DRAWINGS

The present invention will be described in, greater detail below with reference to the following detailed description, which, in turn, refers to the appended drawings, in which:

FIG. 8 is a tabular representation of a code system for use in the present invention;

DETAILED DESCRIPTION

Figure 1:
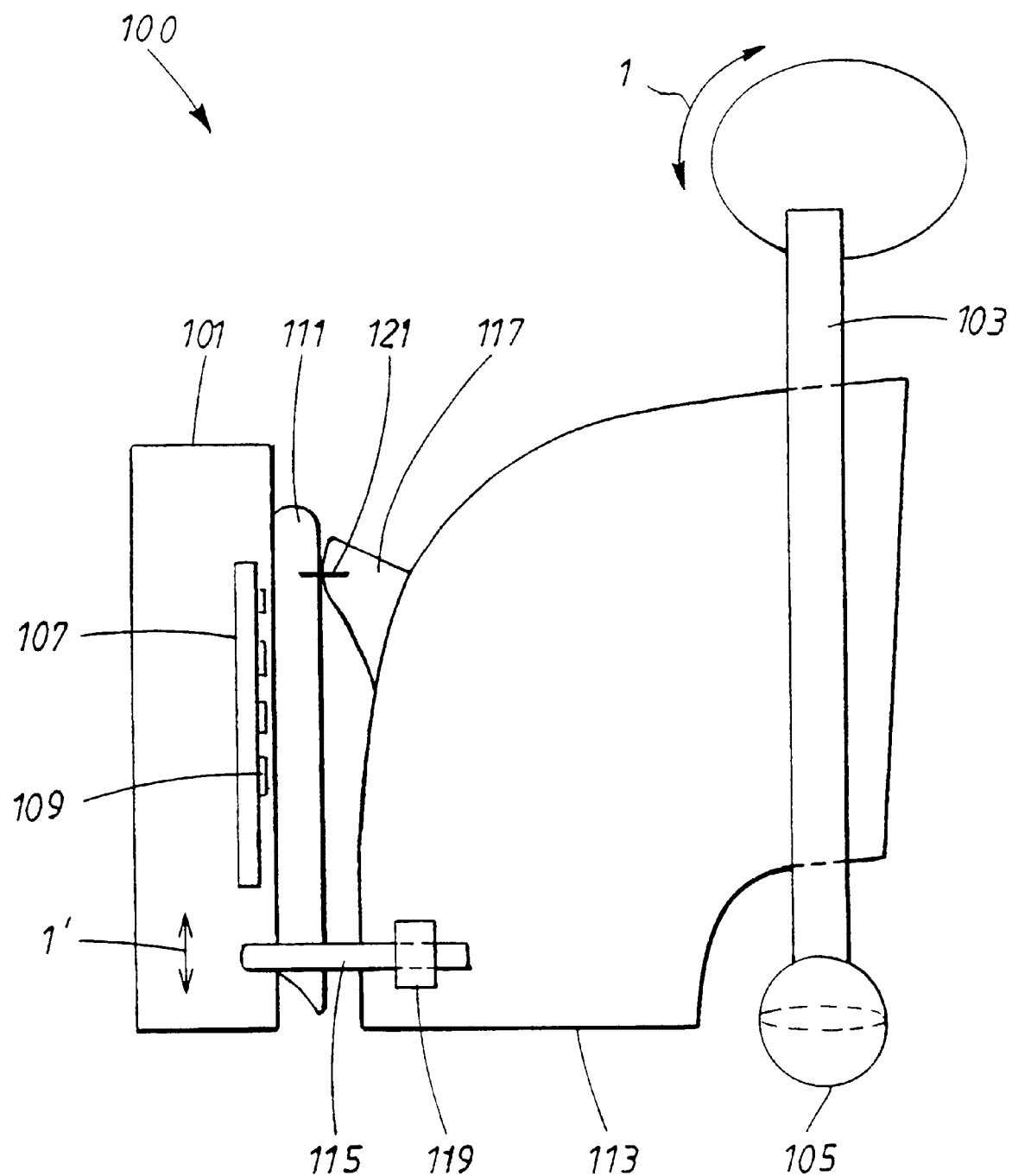
FIG. 1 is a side, elevational, diagrammatic, cross-sectional view of the apparatus of the present invention.

Turning to the Figures, in which like reference numerals refer to like elements thereof, FIG. 1 shows a cross-section of a maneuvering apparatus 100 according to the present invention. The maneuvering apparatus 100 in FIG. 1 is intended to be used for controlling gear positions in a vehicle. The maneuvering apparatus 100 comprises a maneuvering console 101 which, in this embodiment, encloses at least part of the maneuvering apparatus 100. For the sake of clarity, only a relatively small part of the maneuvering console 101 is shown.

The maneuvering apparatus 100 also comprises a maneuvering lever 103, in this particular case a gear lever, which is mounted pivotably about a pivot joint 105 in the form of a ball, by means of which pivot joint 105 the gear lever 103 can be moved relative to the maneuvering console 101 in the direction shown by the arrow 1, and also in another corresponding curved movement essentially at right angles to the curved movement defined by the arrow 1. In that part of the wall of the console 101 which is shown in FIG. 1, there is a sensor arrangement 107, in this case a detector board which is provided with four sensors 109 for reasons that will become clear below.

The maneuvering apparatus 100 in the preferred embodiment shown also comprises a plate 111 which is intended to move when the gear lever 103 moves, and in so doing to interact with the detector board 107 in a manner that will be described in greater detail below. The plate 111 is connected to the gear lever 103 via a frame 113, a pin 115 and a plate spring 117. In a preferred embodiment, both the detector board 107 and the plate 111 are plane and parallel to one another.

So as to ensure that the plate 111 moves with the movements of the gear lever 103, the plate 111 is, as mentioned above, connected to the frame 113 of the gear lever 103 by means of a pin 115 which engages in an opening in the plate 111. The pin 115 runs in a groove (not shown) in the console wall 101, and is biased in the direction towards the console wall 101 by means of a spring element 119.

The plate 111 is also connected to the frame 113 by means of a plate spring 117. This plate spring 117 holds the plate 111 in the same plane as the detector board 107 and engages in the plate 111 but not in the console wall 101, which is shown diagrammatically by the connection 121. This connection 121 can be made in a great many ways, for example by the plate spring 117 engaging in a recess in the plate 111 or, in a preferred embodiment, by means of a pin which engages in an opening in the plate 111 without engaging in the console wall 101.

One of the directions of movement that are possible with the gear lever 103 is shown by the arrow 1 in FIG. 1. When the gear lever 103 moves according to the arrow 1, the plate 111 will move along the console wall 101, over the detector board 107, in the direction shown by the arrow 1', on account of the pin 115 running in a groove (not shown) in the direction of the arrow 1' in the console wall 101 and in doing so taking the plate 111 with it in this direction of movement. It will be understood that the reason why the pin 115 is biased in the direction towards the console wall 101 is to ensure that the pin 115 remains in the groove (not shown) during its movement according to the arrow 1'.

The essentially two-dimensional movement of the gear lever 103 in the direction of the arrow 1 is thus converted into an essentially one-dimensional movement of the plate 111 in the direction of the arrow 1'.

Figure 2:
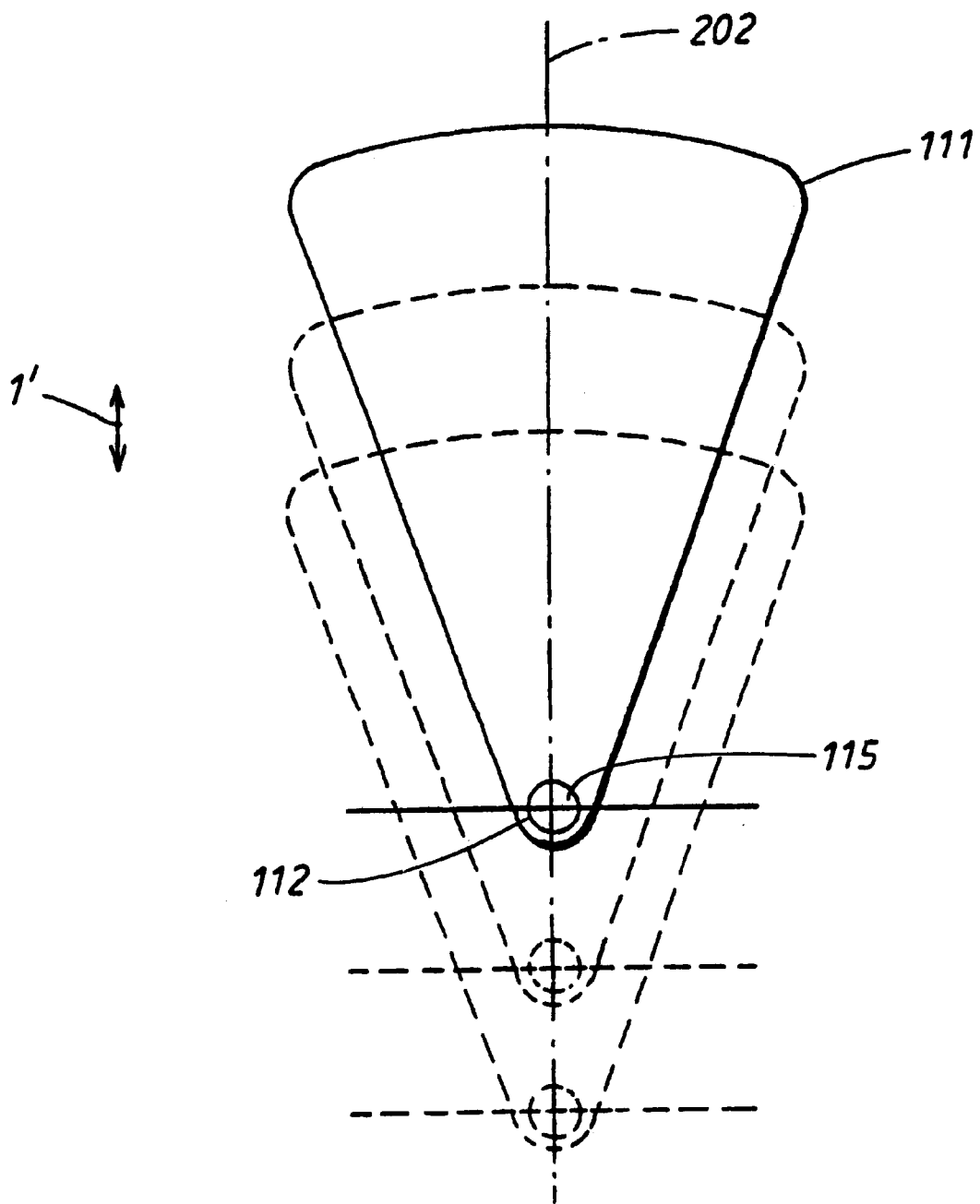
FIG. 2 is a front, elevational, diagrammatic, cross-sectional view of a code arrangement according to the present invention.

FIG. 2 shows an outline of the plate 111, its direction of movement 1' during movement of the gear lever according to the arrow 1, and also a number of different positions that the plate 111 can assume during movement in the direction of movement 1'. FIG. 2 also shows the opening or aperture 112 in the plate 111, in which the pin 115 engages, and also an imaginary center line 202 in the plate 111.

Figure 3:
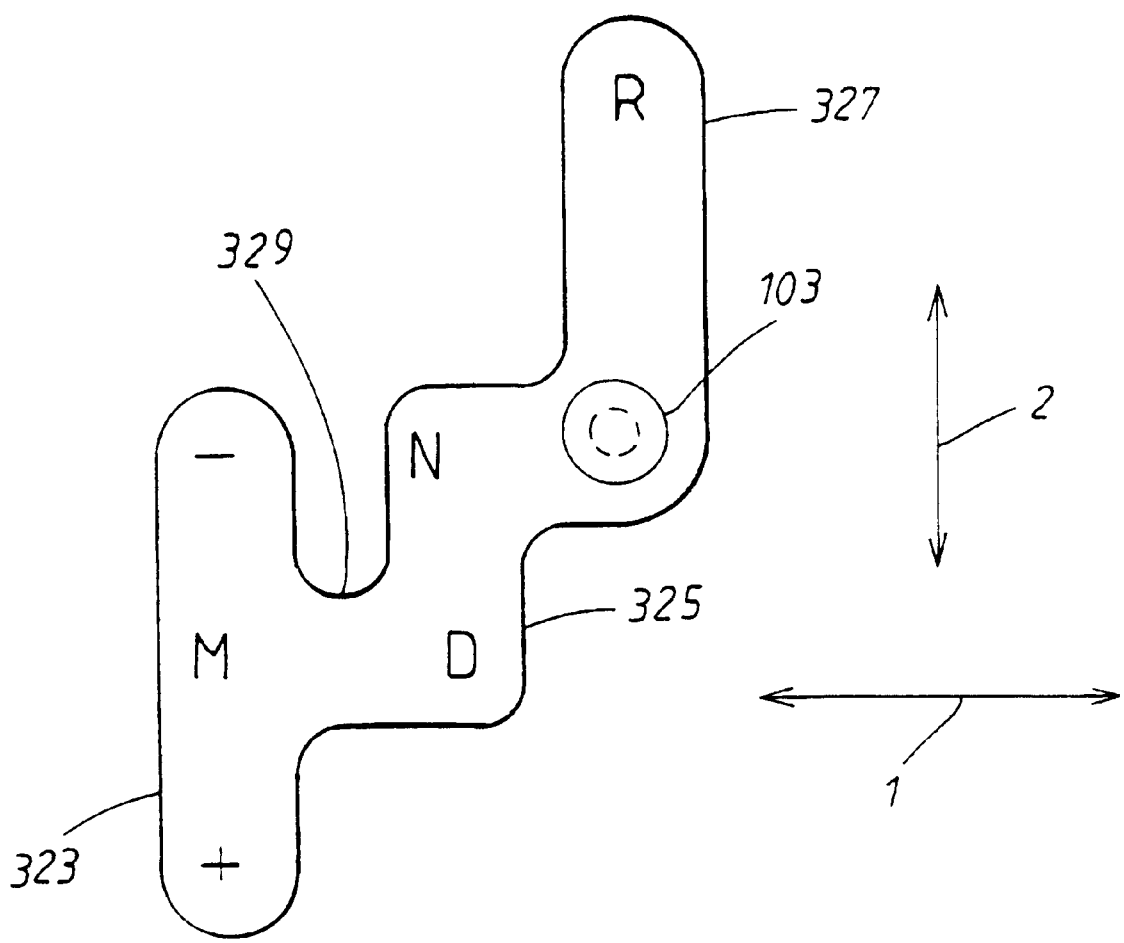
FIG. 3 is a top, elevational, diagrammatic view of the available movement patterns of the gear lever in a preferred embodiment of the present invention.

FIG. 3 shows diagrammatically from above the available positions that the gear lever 103 according to the present invention can assume in this preferred embodiment, and also grooves in the maneuvering console, in which the gear lever 103 can be moved so as to reach its various positions.

As can be seen in FIG. 3, the gear lever 103 in the preferred embodiment has six positions, designated below as R, N, D, –, + and M, where the positions + and – correspond to upshifting and downshifting, respectively, in a manual mode in an automatic gearbox, M is a resting position between + and –, N is the neutral position, D corresponds to the drive position in an automatic gearbox and R is the reverse position.

As can also be seen in FIG. 3, the embodiment of the present invention shown therein comprises three essentially longitudinal grooves 323, 325, and 327 for the movements of the gear lever 103, and also an essentially transverse groove 329 for movement of the gear lever 103.

The arrow 1 shows the same movement as in FIG. 1, but in this case as seen from above, corresponding to the gear lever 103 moving in the transverse groove 329. The movement of the gear lever 103 in the three longitudinal grooves 323, 325, and 327 is shown by the arrow 2. It is to be understood that the movement that the gear lever 103 performs in the longitudinal grooves and that shown by the arrow 2 is a curved movement, like the movement shown by the arrow 1 in FIG. 1, and also that the two curved movements defined by the arrows 1 and 2 are essentially at right angles to one another.

With reference to the above, it will be understood that, when the gear lever 103 moves according to the arrow 1, the plate 111 will, because of engagement of the pin 115 in the opening in the plate 111, move in the direction of the arrow 1' and, when the gear lever 103 moves according to the arrow 2, the plate 111 will rotate about the pin 115 in the direction of movement of the arrow 2. This rotational movement of the plate 111 occurs because the pin 115 engages in the plate 111 and in the console wall 101 and thus constitutes an axis of rotation for the plate 111, and also because the plate spring 117 causes the plate 111 to rotate about this axis of rotation as the plate spring 117 is connected to the plate 111 by means of the connection 121.

Therefore, during movement of the gear lever 103 according to the arrow 2, the plate 111 will move in a circular arc over a surface that coincides with the plane defined by the plane detector board 107. In this way, in other words, it is now possible to convert all of the movements of the gear lever 103 into movements of the plate 111 in essentially one plane. It is to be pointed out that the noun "plane" used above and below relates to an essentially two-dimensional area, which in different embodiments of the present invention may have different shapes, for example plane or curved.

When the main direction of movement of the gear lever 103 is according to arrow 2, the gear lever 103 is located in one of the longitudinal grooves 323, 325, or 327, that are shown in FIG. 3. Depending on which of the longitudinal grooves, 323, 325, or 327, the gear lever 103 is located in, the abovementioned circular arc will have a radius of different size because the pin 115 will assume different positions in the direction of the arrow 1'. In the preferred embodiment, three longitudinal grooves are shown and, consequently, there will be three different radii for this circular arc.

Figure 4:
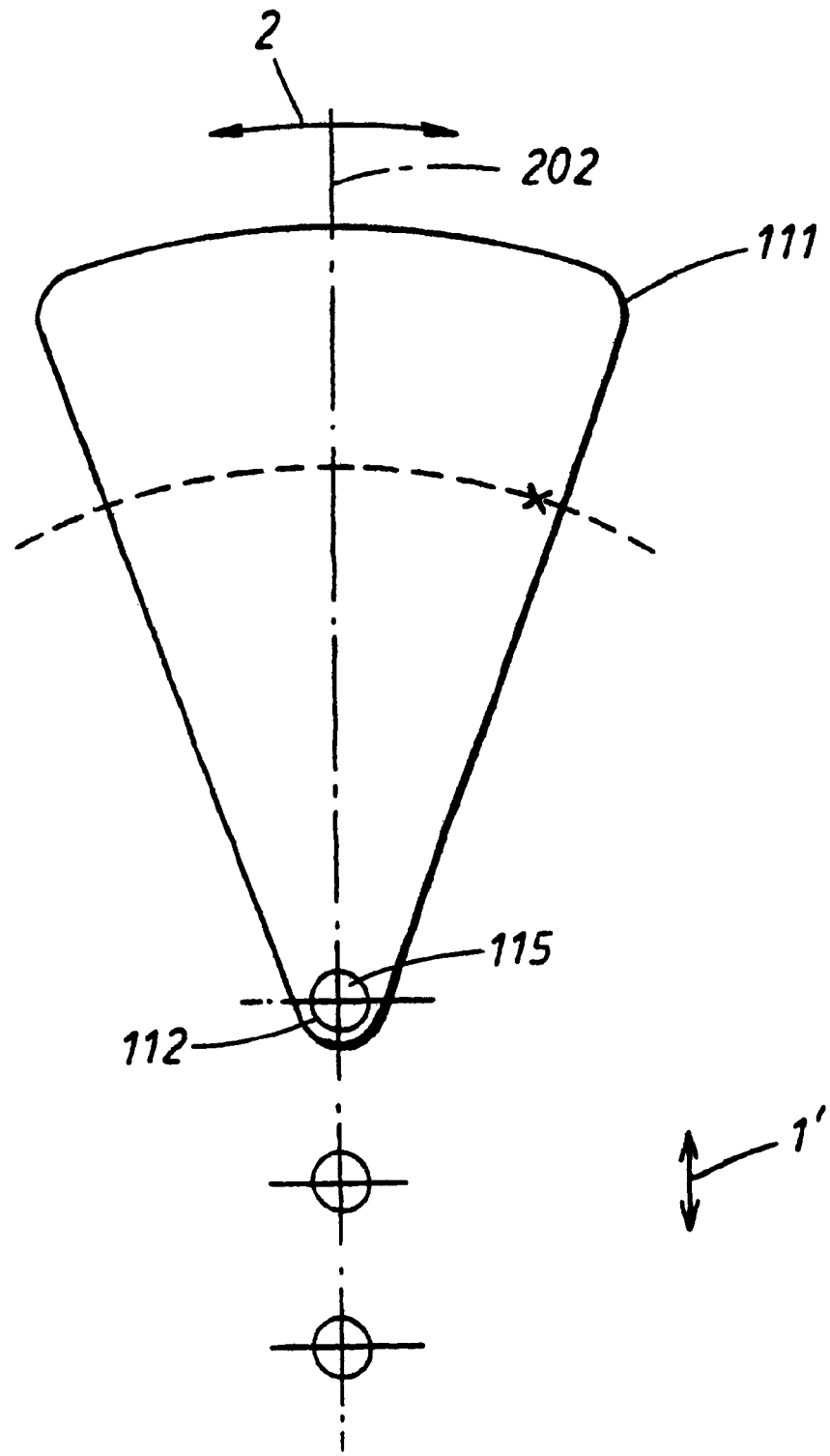
FIG. 4 is a top, elevational, diagrammatic view of a direction of movement of a code arrangement according to the present invention.

The principle of the rotation of the plate 111 in a circular arc during movement of the gear lever 103 according to the arrow 2 is shown in FIG. 4. FIG. 4 shows the outline of the plate 111, an imaginary center line 202 in this outline, and also, by a dashed line, the circular arc along which a given point x on the plate 111 will move during movement of the gear lever 103 according to the arrow 2.

FIG. 4 also shows the three different positions according to the arrow 1' that the pin 115—and thus the plate 111—can assume in the preferred embodiment. In this way, it will be understood that the point x on the plate 111, like every point on the plate 111, will be able to move along three different circular arcs, depending on which of the longitudinal grooves, 323, 325, and 327, the gear lever 103 is located in.

Figure 5:
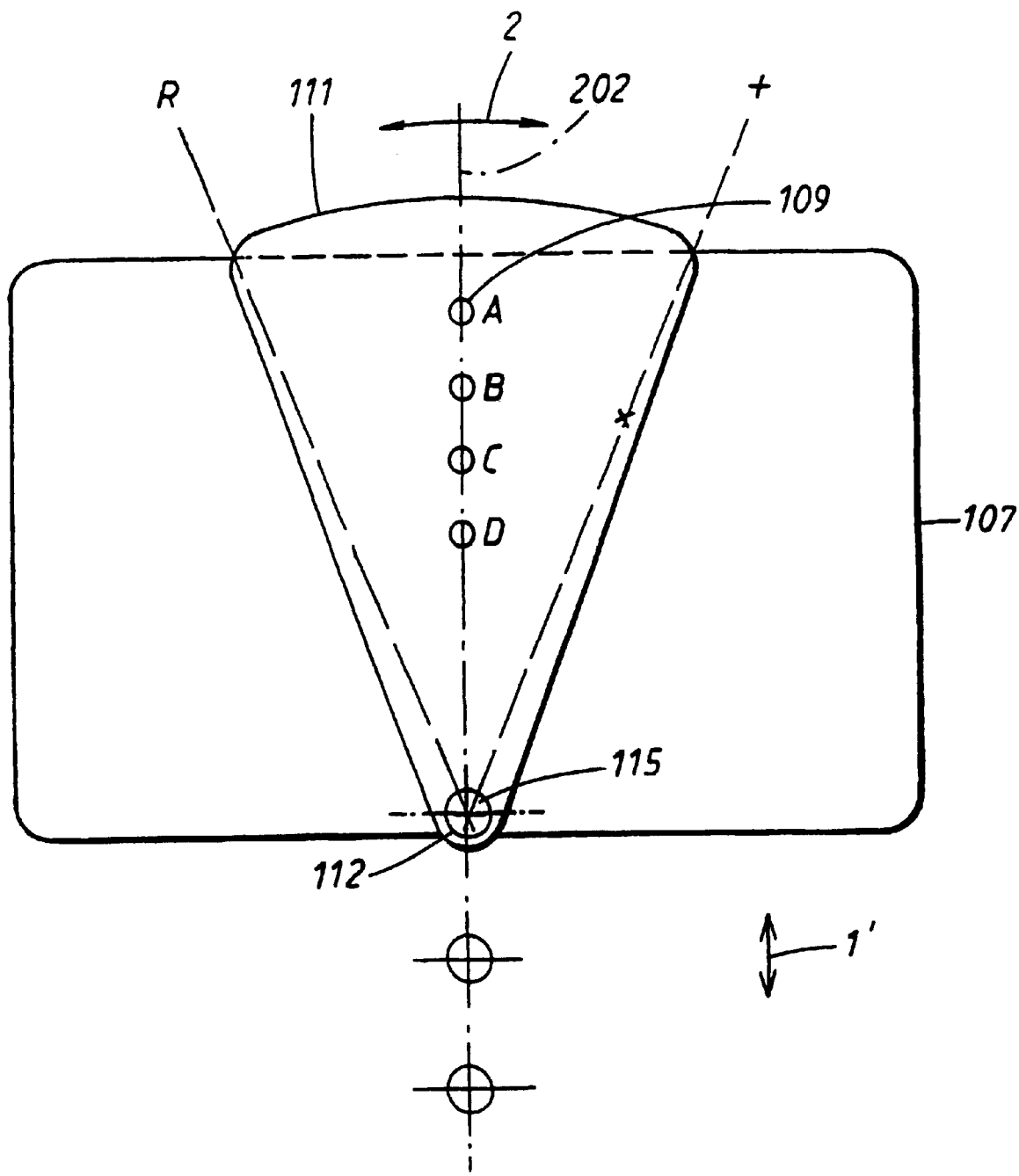
FIG. 5 is a front, elevational view of the code arrangement and the sensor arrangement according to the present invention.

FIG. 5 shows the plate 111, the imaginary center line 202 of the plate 111, the point x on the plate 111 and also, located behind the plate 111, the detector board 107 which in this example is provided with four sensors 109, designated below as A, B, C and D. Dashed lines show the outer positions that the imaginary center line 202 of the plate 111 can assume during its rotation about the pin 115, which outer positions correspond to the two positions of the gear lever 103 located furthest from one another, the positions "R" and "+" in the example shown. As the area that the imaginary center line 202 of the plate 111 covers during movement between its outer positions forms a circular segment, the suitability of designing the plate 111 as a circular segment with a size adapted to the above-mentioned area will be understood.

Figure 6:
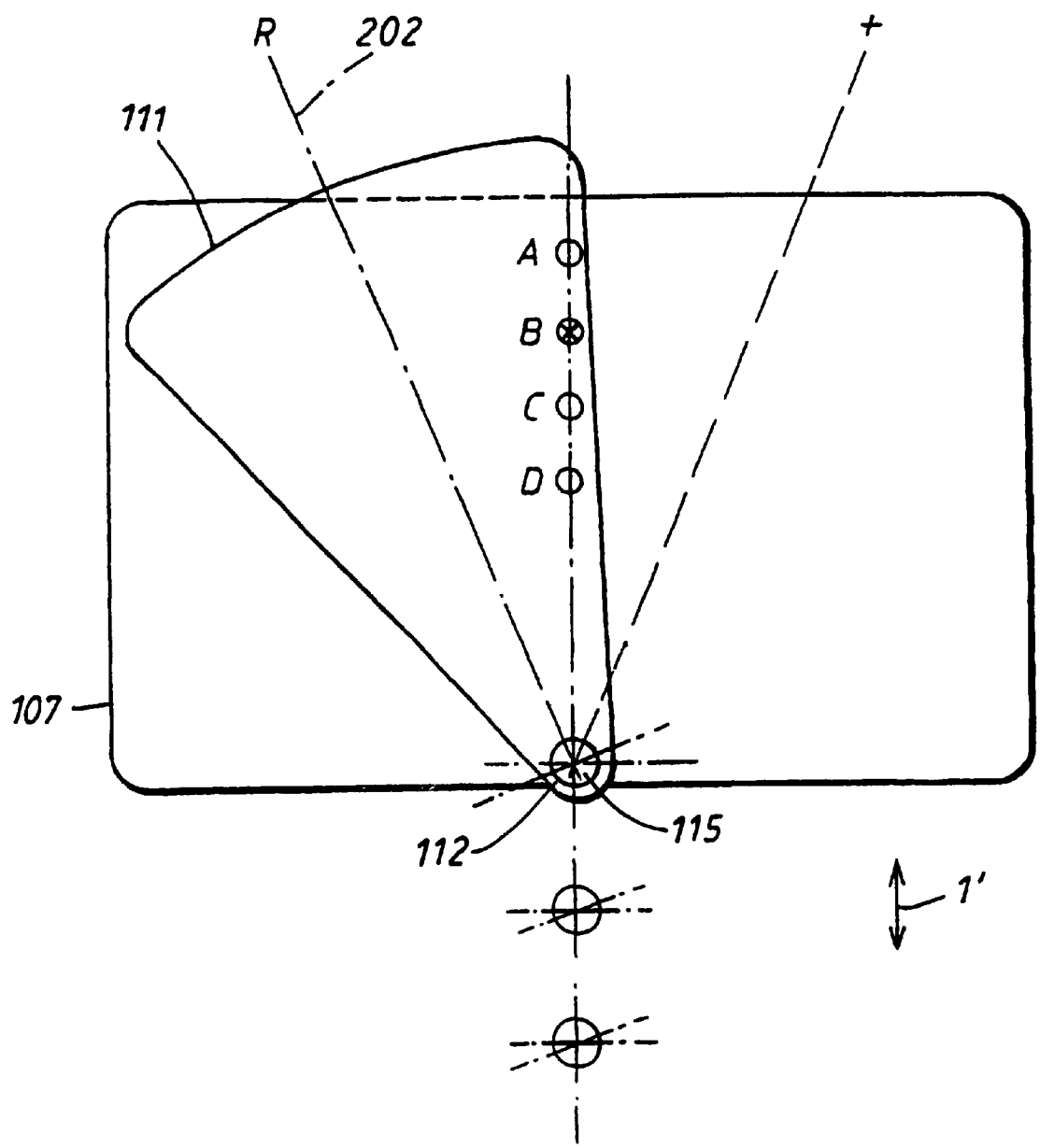
FIG. 6 is a front, elevational view showing the principle of the interaction of the code arrangement with the sensor arrangement of the present invention.

The principles of the interaction according to the present invention of the plate 111 with the detector board 107 will now be clear, and are shown in FIG. 6. FIG. 6 shows the plate 111 in the position that corresponds to the gear lever 103 being in the "R" position. The detector board 107 is arranged in a fixed manner in the console wall 101, for which reason the detector board 107 and its sensors are in the same position as in FIG. 5. As can be seen in the drawing, the point x on the plate 111 is now in front of sensor B.

As the plate 111 moves with the movements of the gear lever 103, and each of the positions of the gear lever 103 corresponds to a unique position of the plate 111 relative to the detector board 107, detection of the positions of the gear lever 103 can take place by the plate 111 being provided with a suitable coding which can be detected by the detector board 107. In this way, the plate 111 becomes a code plate.

In a preferred embodiment, the sensors A, B, C, and D in the detector board 107 are so-called Hall sensors, which can detect variations in magnetic fields. In this embodiment, the plate 111 is preferably a magnetized plastic plate, the entire plate 111 being magnetized as a "south pole", except for certain of the regions on the plate 111 which will end up in front of the sensors A, B, C, and D in the different positions of the gear lever 103. These regions are then magnetized as a "north pole".

In the example shown, four sensors are used, which means that the detector board 107 will be able to produce a four-digit binary code, where "0" of a sensor corresponds to a "south pole" on the code plate 111 and "1" of a sensor corresponds to a "north pole" on the code plate 111.

As can be seen in FIG. 6, the point x on the plate 111 ends up in front of sensor B when the gear lever 103 is in the "R" position. The point x has been magnetized as a "north pole", and the remainder of the plate 111 is a "south pole", which, in other words, means that the code that is detected by the detector board 107 in the "R" position of the gear lever 103 becomes A=0, B=1, C=0, and D=0.

Figure 7:
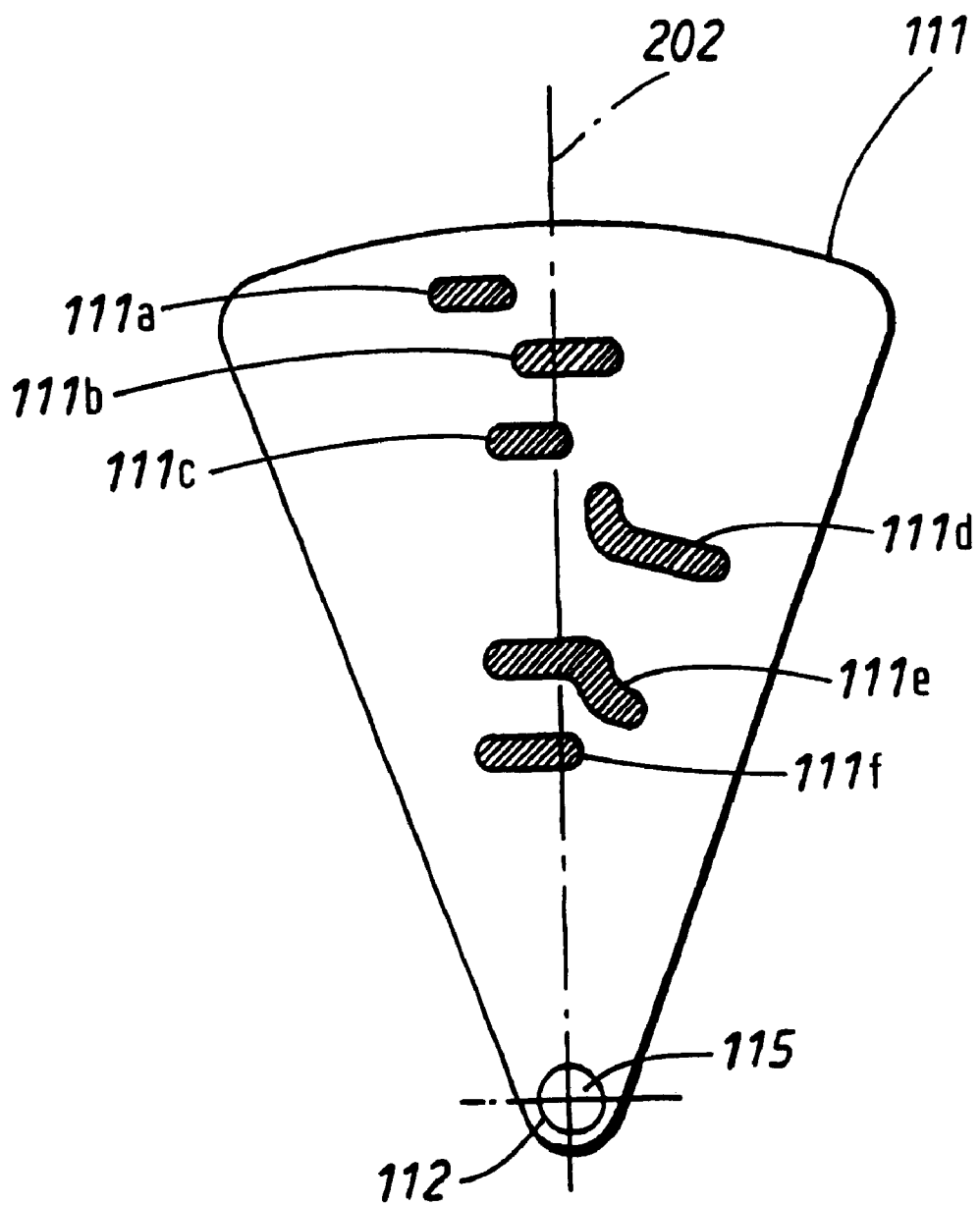
FIG. 7 is a front, elevational view of a preferred embodiment of the code arrangement according to the present invention.

Correspondingly, "north poles" are magnetized in regions of the code plate 111 that correspond to the other positions of the gear lever 103. The "north poles" are introduced in such a manner that the desired code is produced for each of the positions of the gear lever 103. Arbitrary codes may of course be used, the only requirement for the code being that it is unique, although a suitable code in this connection is the so-called Gray code, which means that only one position in the four-figure binary code is changed when the gear lever 103 is moved between two closely-situated positions. FIG. 7 shows a code plate 111 according to the present invention coded in this manner, with an imaginary center line 202. The coded regions in FIG. 7 are designated as regions 111a, 111b, 111c, 111d, 111e and 111f thereon.

Some of the "north poles" on the code plate in FIG. 7 consist of relatively large continuous regions. This is due to the above-mentioned principle of only changing one figure at a time in the code. Some of the Hall sensors in the detector board 107 will then be covered by "north poles" in a number of successive positions, for which reason the positions on the code plate 111 corresponding to these positions have been connected and formed into a larger, continuous "north pole".

FIG. 8 shows an example of a complete code table according to the present invention for all the positions of the gear lever 103. Not all the codes in the table are used in the example.

Figure 9:
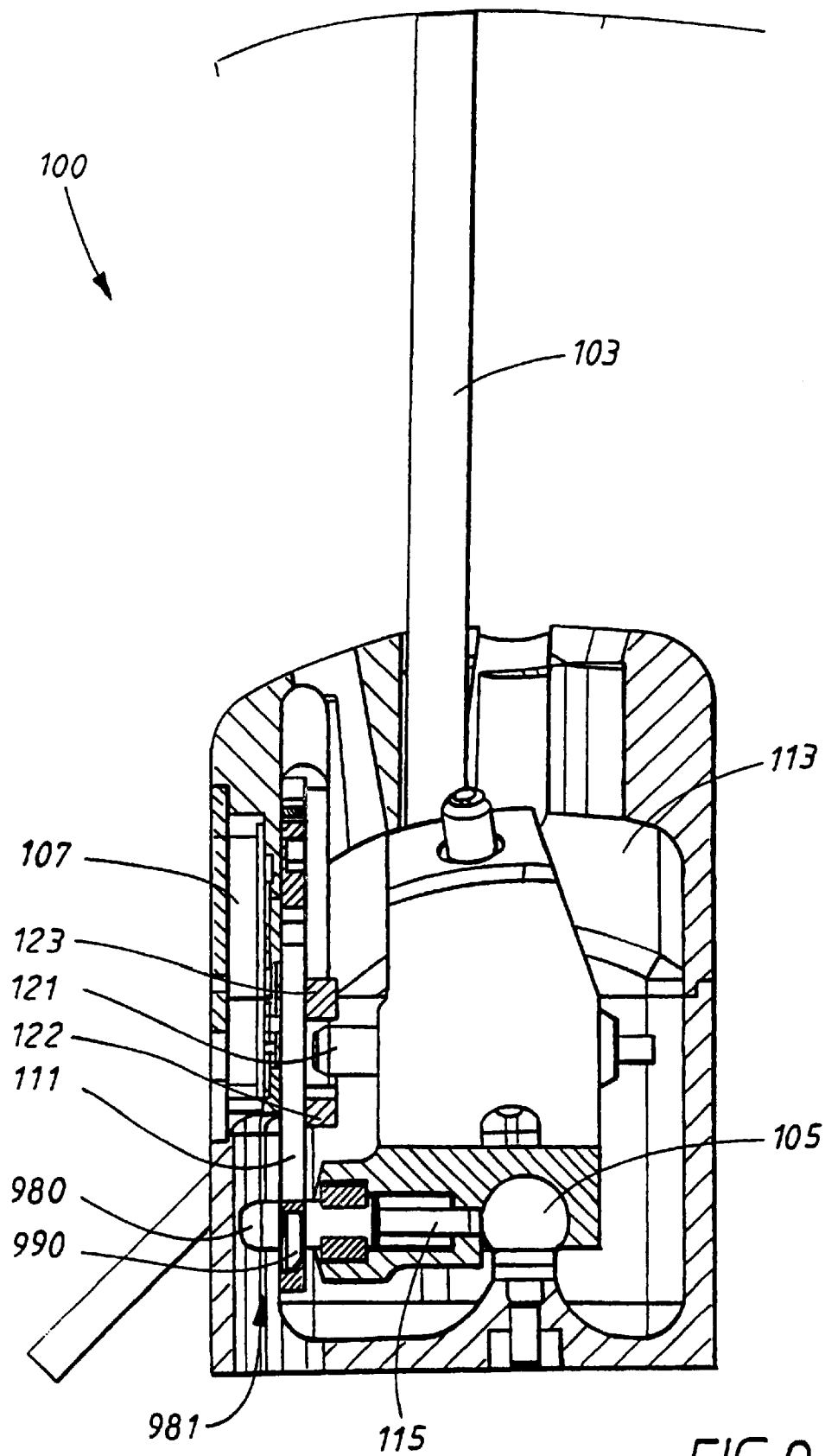
FIG. 9 is a side, elevational exploded view of a preferred embodiment of the present invention.

FIG. 9 shows a more detailed exploded view of a preferred embodiment of a maneuvering apparatus 100 according to the present invention. The reference numbers in FIG. 9 correspond to those in FIG. 1. FIG. 9 also shows in greater detail how the pin 115 is designed and how it interacts with the code arrangement 111. As indicated in FIG. 9, and as will be described in greater detail below, the pin 115 is designed in such a manner that that part 990 of the pin which is in mechanical contact with the plate 111 is shaped like a slice from an imaginary sphere. Those parts of the plate 111 which come into mechanical contact with this part of the pin 115 are in turn shaped like the inside of a corresponding imaginary sphere.

As has been mentioned previously in this description, the pin 115 runs in a groove (not shown) in the console wall. In order to facilitate movement of the pin in the groove 981, at least that part 980 of the pin which runs in the groove 981 is designed as a narrower part that projects from the center of that part 990 of the pin which comes into mechanical contact with the plate 111. This is also shown in FIG. 9. In principle, however, the whole of the imaginary sphere could be included in the pin 115.

Figure 10:
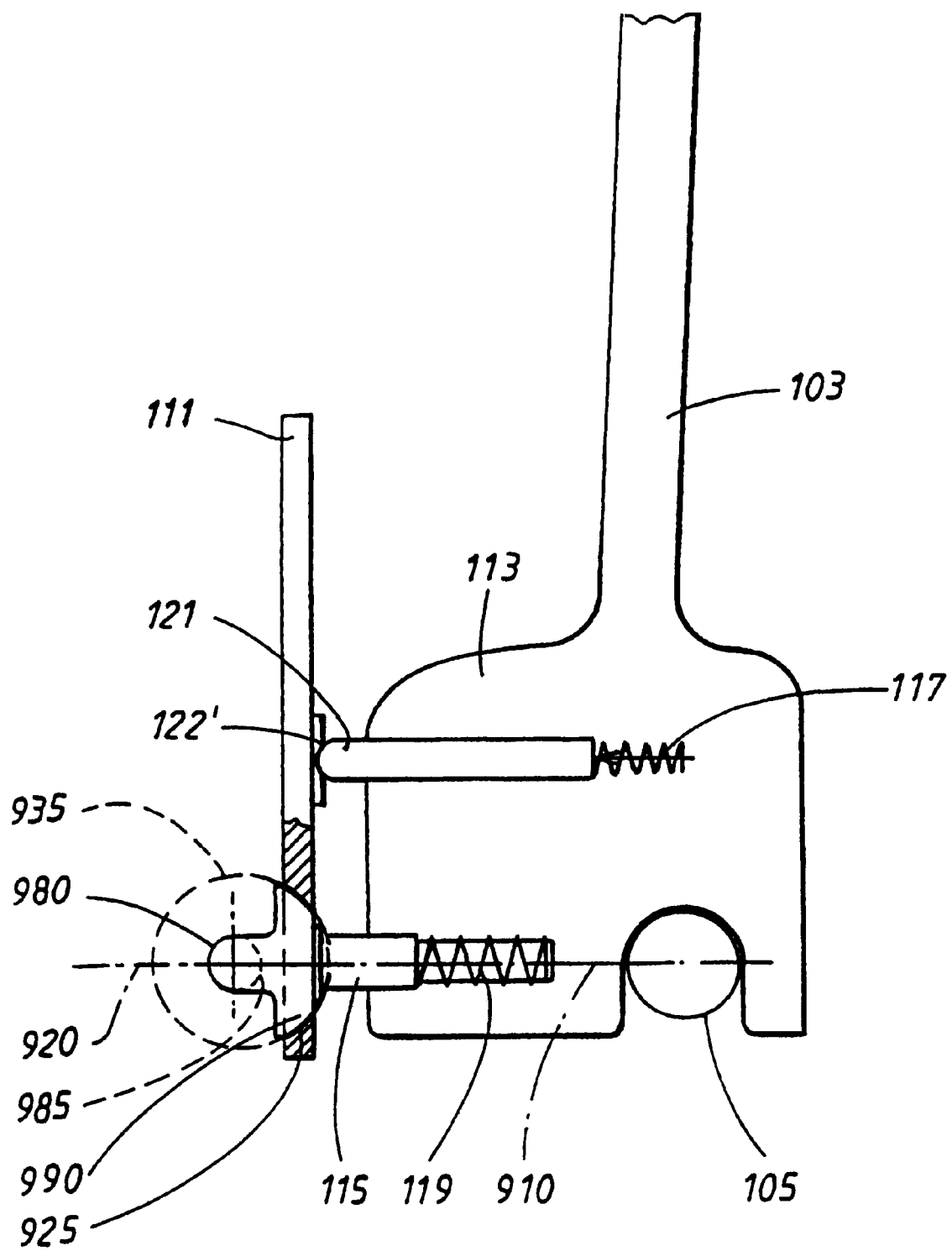
FIG. 10 is a side, elevational, diagrammatic, partly sectional view showing the principle of movement of a code arrangement according to the present invention.

FIG. 10 shows in greater detail the principle of interaction of the pin 115 with the code plate 111. As has been described previously, that part 990 of the pin 115 which comes into mechanical contact with the plate 111 is shaped like a slice from an imaginary sphere 935, which is shown by dashed lines. The end point 980 of the pin 115 is shaped like part of a smaller sphere 985, which is also shown by dashed lines. The pivoting axis 920 for the movements of the plate 111 passes through the center of this smaller sphere, at right angles to the plate 111. It is advantageous to design the arrangement so that the center of the smaller sphere constitutes the point of intersection of the two pivoting axes 910, 920 during all movements and in all positions of the gear lever 103.

The direction in which the pin 115 has its main extension coincides with the pivoting axis 910 of the lever 103. In a preferred embodiment, as shown in FIG. 10, the pivoting axis 910 of the lever 103 passes through the center of the pin 115 in the longitudinal direction of the pin.

When the maneuvering lever 103 is in the position shown in FIG. 10, the pivoting axis 910 of the lever 103 coincides with the pivoting axis 920 for the movements of the plate.

Figure 11:
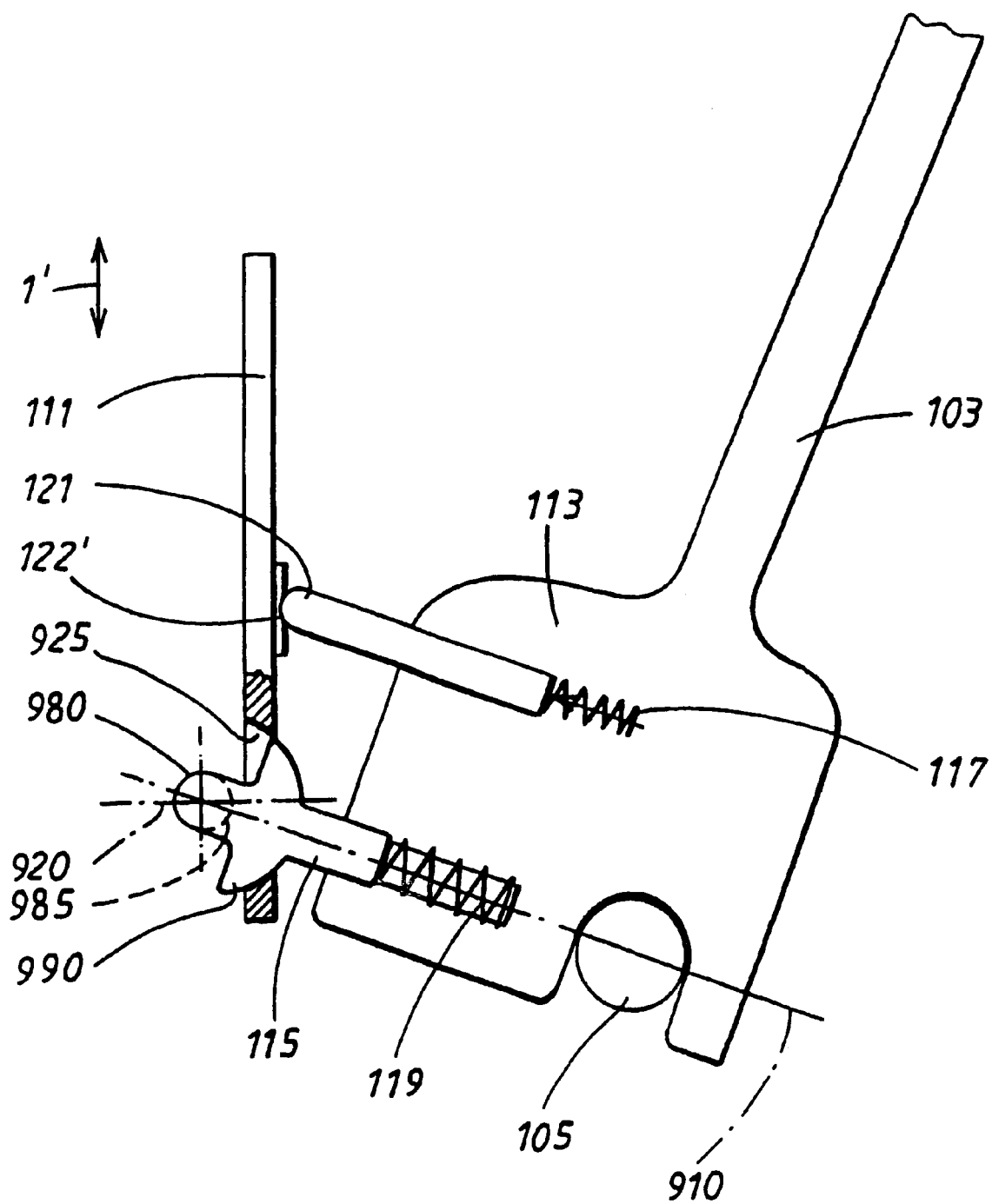
FIG. 11 is a side, elevational, diagrammatic, partly sectional view showing the principle of movement of the code arrangement in FIG. 10.

FIG. 11 shows the interaction of the pin 115, with the code plate 111 when the gear lever 103 is in a different position to that shown in FIG. 10. The spherical. design of that surface 925 in the plate 111 which comes into mechanical contact with the pin 115 can also be seen in FIG. 11.

In the position of the lever 103 shown in FIG. 11, the plate 111 has been moved in the direction indicated by the arrow 1'. Irrespective of this, the pivoting axis 920 for the movements of the plate 111 will be at right angles to the plate, which applies for all the movements and shifts the plate 111 can perform.

The second element 121 that plays a part in the movements of the plate is parallel to the pivoting axis 910 of the gear lever 103 during all movements of the gear lever 103, and is maintained in position by means of interaction with side wall elements 122 in FIG. 9 and 112' in FIGS. 10 and 11.

By virtue of the spherical design of those parts of the pin 115 and the plate 111 which come into mechanical contact with one another, the angle of the element 117 relative to the pivoting axis 910 of the maneuvering lever 103, and also the fact that the pivoting axis 920 for the movements of the plate 111 is at right angles to the plane of movement of the plate, all movements and shifts of the plate 111 take place in one plane.

The present invention is not limited to the embodiment described above, but may be freely varied within the scope of the appended patent claims. The sensor principle that is used does not, for example, need to be Hall sensors and a magnetized code plate, but may be arbitrary interacting code members and sensors, for example a light-emitting or light-permeable plate together with light-sensitive sensors.

The code arrangement and the detector arrangement have in the description above been shown as planar plates, but other embodiments of these are also possible, if the principle of a two-dimensional movement of the code arrangement relative to the detector arrangement is retained. As the movements of the gear lever in the example take place over a curved area, a dome-shaped detector arrangement that detects movements over a dome-shaped plane of a code arrangement could be possible.

The principle described above can of course be used in gear levers with more or fewer gear positions than those shown above. The principle described above can also be used in applications of maneuvering levers that are quite different to gear levers for motor vehicles, for example steering levers for various types of vehicle and craft.

The principle described above for converting the movements of the gear lever into movement in two dimensions of the code arrangement can of course be achieved in a number of alternative ways. One possible alternative is, for example, the code arrangement moving in tracks in the maneuvering console, which could replace the pin.

The structure in which the code plate and/or the detector arrangement are arranged does not have to be a maneuvering console, but can be an, on the whole, arbitrarily selected structure in the vehicle.

In an alternative embodiment according to the present invention, the code plate can also be given codes for positions that correspond to the gear lever being located between any of the gear positions. In this manner, information can be obtained about the gear lever undergoing shifting, and the direction of such shifting.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Maneuvering apparatus comprising a console, a maneuvering lever disposed relative to said console and movable between a plurality of predetermined positions including positions in at least two different planes, a planar detector mounted with respect to said console, a coding member mounted parallel to said planar detector for interacting with said planar detector based upon the relative positions of said coding member and said planar detector, said planar detector adapted to detect the relative position of said coding member, and connecting means for connecting said maneuvering lever to said coding member whereby movement of said maneuvering lever between said plurality of predetermined positions in said at least two different planes causes said coding member to move substantially only in a single plane parallel to said detector.

2. The maneuvering apparatus of claim 1 wherein said coding member includes an aperture and said console includes a groove, said connecting means comprising at least one frame associated with said maneuvering lever, and at least one bias pin mounted with respect to said at least one frame, said at least one bias pin being biased into a position projecting from said at least one frame whereby said at least one bias pin thereby projects through said aperture of said coding member and is movable in said groove in said console.

3. The maneuvering apparatus of claim 2 wherein said connecting means includes at least one plate spring associated with said frame and engaged with said coding member.

4. The maneuvering apparatus of claim 1 wherein said detector comprises a plurality of Hall elements, and wherein said coding member comprises a plate including a plurality of magnetized regions for interacting with said plurality of Hall elements.

5. The maneuvering apparatus of claim 1 wherein said maneuvering lever comprises a gear lever in a motor vehicle.

6. Maneuvering apparatus comprising a console including a groove, a maneuvering lever disposed relative to said console and movable between a plurality of predetermined positions, a planar detector mounted with respect to said console, a coding member including an aperture mounted parallel to said planar detector for interacting with said planar detector based upon the relative positions of said coding member and said planar detector, said planar detector adapted to detect the relative position of said coding member, and connecting means for connecting said maneuvering lever to said coding member whereby movement of said maneuvering lever between said plurality of predetermined positions causes said coding member to move substantially only in a single plane parallel to said detector said connecting means comprising at least one frame associated with said maneuvering lever, and at least one bias pin mounted with respect to said at least one frame, said at least one bias pin being biased into a position projecting from said at least one frame whereby said at least one bias pin thereby projects through said aperture of said coding member and is movable in said groove in said console.

7. The maneuvering apparatus of claim 6 wherein said connecting means includes as least one plate spring associated with said frame and engaged with said coding member.

* * * * *